United States Patent
Lilie et al.

(10) Patent No.: US 7,015,613 B2
(45) Date of Patent: Mar. 21, 2006

(54) LINEAR ELECTRIC MOTOR

(75) Inventors: Dietmar Erich Bernhard Lilie, Joinville (BR); Ingwald Vollrath, Joinville (BR)

(73) Assignee: Empresa Brasileira De Compressores S.A. -Embraco, Joinville (BR)

( * ) Notice: Subject to any disclaimer, the term of this patent is extended or adjusted under 35 U.S.C. 154(b) by 0 days.

(21) Appl. No.: 10/474,272

(22) PCT Filed: Apr. 3, 2002

(86) PCT No.: PCT/BR02/00047

§ 371 (c)(1),
(2), (4) Date: Oct. 24, 2003

(87) PCT Pub. No.: WO02/082624

PCT Pub. Date: Oct. 17, 2002

(65) Prior Publication Data

US 2004/0145247 A1    Jul. 29, 2004

(30) Foreign Application Priority Data

Apr. 4, 2001   (BR)   .................... 0101750
Apr. 3, 2002   (BR)   ................ PCT/BR02/00047

(51) Int. Cl.
*H02K 21/12* (2006.01)
(52) U.S. Cl. ............ 310/156.01; 310/15; 310/12
(58) Field of Classification Search ............ 310/12–39, 310/156.01, 156.08, 156.12, 156.13, 156.68, 310/263, 156.66, 156.71; 417/410.1, 415, 417/416, 417
See application file for complete search history.

(56) References Cited

U.S. PATENT DOCUMENTS

| | | | |
|---|---|---|---|
| 5,641,088 A | 6/1997 | Unger | 220/613 |
| 5,751,075 A | 5/1998 | Kwon et al. | 319/12 |
| 6,077,054 A * | 6/2000 | Lee et al. | 417/417 |
| 6,097,125 A | 8/2000 | Park et al. | 310/156.45 |
| 6,141,971 A * | 11/2000 | Hanes | 62/6 |
| 6,184,597 B1 * | 2/2001 | Yamamoto et al. | 310/14 |

FOREIGN PATENT DOCUMENTS

JP    11313476 A1    11/1999
JP    2000228855 A1   8/2000

* cited by examiner

*Primary Examiner*—Dang Le

(74) *Attorney, Agent, or Firm*—Darby & Darby

(57) ABSTRACT

A linear electric motor, capable of producing reciprocation of a piston within a cylinder to compress refrigerant gas. The coil of the linear electric motor is mounted to the internal wall of a block that forms the cylinder of the compressor, and a support for the magnets is mounted to an outwardly extending base flange of the piston. The support is formed by a base plate mounted to the base flange with a plurality of "L" shaped finger plates spaced around and affixed to the base plate, with the edges of the long legs of the finger plates extending radially of the piston's central axis. Arcuated shaped permanent magnet are fitted between the opposite flat sides of each pair of the long legs of the finger plates to form a stable and rigid toroidal shaped magnet assembly positioned between the external wall of the cylinder and the coil.

11 Claims, 2 Drawing Sheets

LINEAR ELECTRIC MOTOR

This application claims priority under 35 U.S.C. § 371 based on International Application No. PCT/BR02/00047, filed Apr. 3, 2002; published as WO 02/082624 on Oct. 17, 2002; which claims priority to Brazilian Patent Application PI 0101750-0, filed Apr. 4, 2001.

FIELD OF THE INVENTION

The present invention refers to a linear electric motor and to a support for mounting the magnets of a linear electric motor, generally used in hermetic compressors of refrigeration.

BACKGROUND OF THE INVENTION

Linear electric motors are well known devices. In such a motor, there is provided a stationary shell, in which is mounted a linearly movable member, such as a shaft or a piston. One of the shell and movable member has a magnet or a set of magnets mounted to it, and the other has a coil that receives operating electric current. Supply of operating electric current to the coil produces a magnetic field that interacts with the magnet to produce linear movement of the movable member.

When applied to hermetic compressors of refrigeration, the linear electric motor moves a piston inside a cylinder to compress the refrigerant gas. At least one type of these hermetic compressors of refrigeration uses a linear motor, in which the coil that receives the operating electric current is fixedly mounted to the shell or block of the compressor in which the cylinder is formed, and the magnet or magnets are mounted to the movable member that carries the piston. A resonant assembly driven by the linear motor has the function to develop a linear reciprocating movement, resulting in the movement of the piston inside the cylinder exerting a compression action on the gas received through a suction valve of the compressor, until the point is reached in which the gas is discharged to the high pressure side of the compressor.

In these hermetic compressors of refrigeration, the magnet or magnets is/are mounted to a support carried by the piston. The construction of the support presents several technical difficulties, one of these resulting from the fact that the material of the support is subjected to the magnetic field produced by the coil. Since the support is movable and exposed to the magnetic field, if it is made of a metallic material, for example stainless steel, the material of the support generates Foucault currents, causing energy losses.

The problem of losses due to Foucault currents is known and solutions have been proposed, such as those disclosed in U.S. Pat. Nos. 5,642,088, 5,751,075, and 6,097,125. In U.S. Pat. No. 6,097,125, a "cylindrical cup" made of a non-magnetic material is provided to reduce the effect of losses due to Foucault currents, the cup having grooves located between its internal and external walls in which the magnets are mounted. Such structure is constructively complex and presents high costs with material for producing the cup shaped support.

By reason of the above, there is a need for providing a support for a linear electric motor to attach the magnets of said motor, having low cost and a construction that minimizes energy losses caused by Foucault currents. It is also desired the provision of such a magnet support structure for use in a refrigeration compressor, in which the piston is linearly reciprocated by the action of a linear electric motor.

OBJECTS OF THE INVENTION

It is an object of the present invention to provide a support for mounting the magnets to be used in a linear electric motor, said support using a small quantity of material and having such construction as to reduce the energy losses due to Foucault currents. It is another object of the present invention to provide a support, as cited above, for mounting the magnets used in a linear electric motor that drives the piston of a hermetic compressor of refrigeration.

SUMMARY OF THE INVENTION

According to a preferred embodiment of the invention, a linear motor is used in a hermetic compressor of refrigeration to produce the reciprocating movement of a piston inside a cylinder, in order to compress the refrigerant gas. The coil of the electric motor is mounted to an internal wall of a block that forms the cylinder of the compressor, and a magnet support is mounted to a base flange of the piston extending outwardly from the contour of the latter. The magnet support is formed by a base plate mounted to the base flange of the piston and by a plurality of "L" shaped thin finger plates, which are spaced around and attached to the base plate, with the edges of the long legs of the finger plates extending radially of the central axis of the piston. An arcuate shaped permanent magnet is fitted between each pair of the long legs of the finger plates, in order to form a toroidal shaped magnet assembly that is stable and rigid.

The magnet support is mounted to the base flange of the piston and the toroidal magnet assembly is positioned between the external wall of the cylinder and the energizing coil. When electric current is applied to the coil, the magnetic lines of force react with the permanent magnets of the toroidal structure to generate a force that produces linear displacement of the piston, thus resulting in compression of the gas admitted through the suction valve of the compressor.

The support structure of the present invention uses only flat plate material and in a small amount for defining the finger plates, which material can be of a relatively inexpensive type and with a configuration that reduces energy losses due to Foucault currents.

BRIEF DESCRIPTION OF THE DRAWINGS

The present invention will be described below, with reference to the attached drawings, in which.

DETAILED DESCRIPTION OF THE INVENTION

Figure 1:
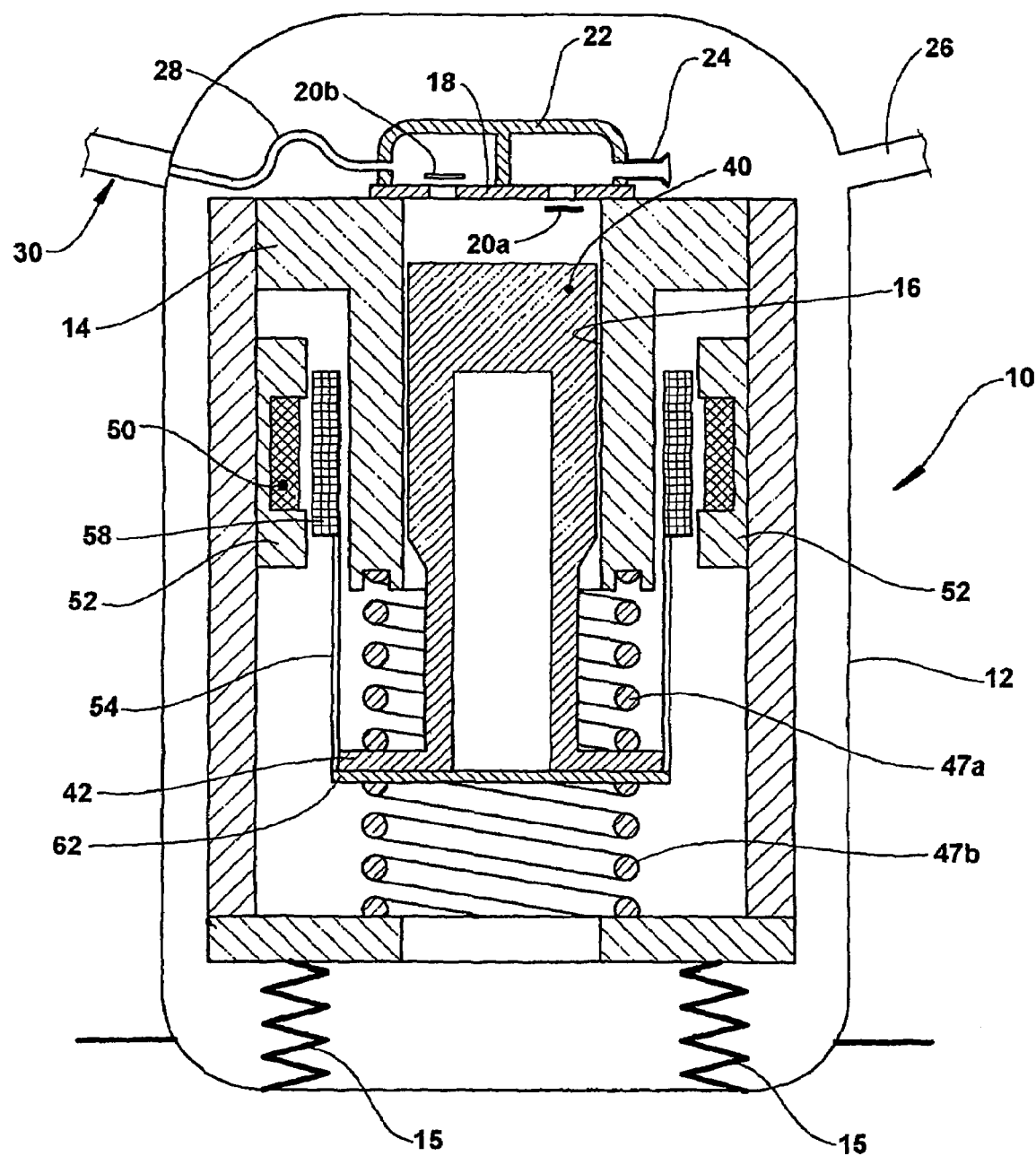
FIG. 1 is a partially cut lateral elevational view of a hermetic compressor of refrigeration, including a linear electric motor with a magnet support according to the present invention.

FIG. 1 shows a hermetic compressor 10 of the linear type for small refrigeration systems, having a hermetic shell 12, inside which is positioned a block 14 mounted to shock absorbers in the form of springs 15. Block 14 forms a cylinder 16 closed by a valve plate 18 on the cylinder head. A suction valve 20a and a discharge valve 20b are formed in the valve plate 18. The suction and discharge valves 20a and 20b control the admission and discharge of gas in relation to the cylinder. The valves are covered by a muffler 22 and there is an inlet duct 24 to the suction side of the muffler, and an outlet duct 28 from the discharge chamber of the muffler. The suction inlet to the hermetic shell 12 is shown at 26 and the outlet of compressed refrigerant gas from the hermetic shell is shown at 30.

The compression of the gas is produced by the axial movement of a piston 40 inside the cylinder 16. Piston 40 has a hollow interior and a base flange 42 at its end opposite to the valve plate 18. Piston 40 is driven by a linear electric motor actuator, which is formed by a toroidal shaped coil 50 and by a support 54, to be described in details below, and which carries a plurality of permanent magnets 58 in close proximity to the coil 50.

The coil 50 is fastened to a yoke 52 mounted to the internal wall of the block 14. The coil 50 extends completely around the internal wall of the block 14. The support 54 for the magnets 58 is mounted to the base flange 42 of the piston. A first helical spring 47a is located between the base flange 42 of the piston and the lower end of the cylinder 16, while a second helical spring 47b is mounted between the base flange 42 and the block 14. The helical springs 47a and 47b are always under compression. The piston 40, the actuator of the linear electric motor, and the helical springs 47a and 47b form together a resonant assembly of the compressor.

Figure 2:
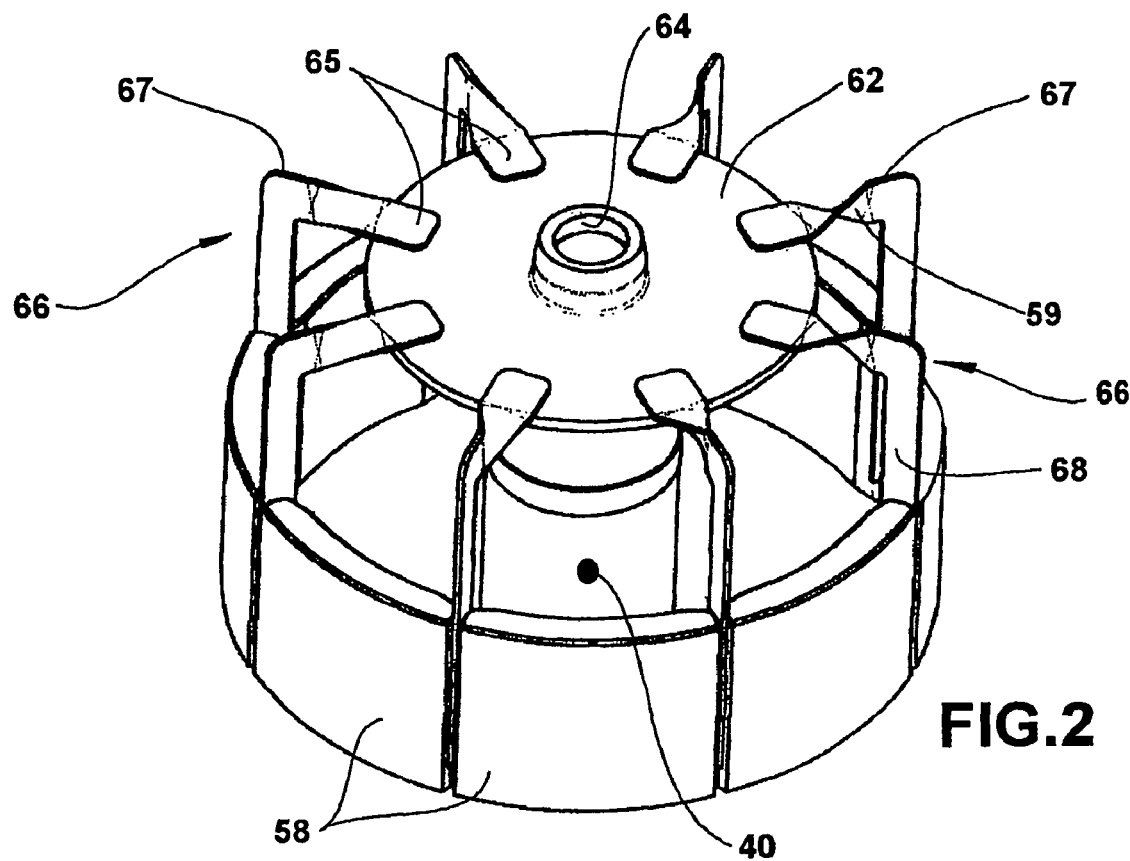
FIG. 2 is an upper perspective view of the support of the invention, with the magnets mounted thereto.
Figure 3:
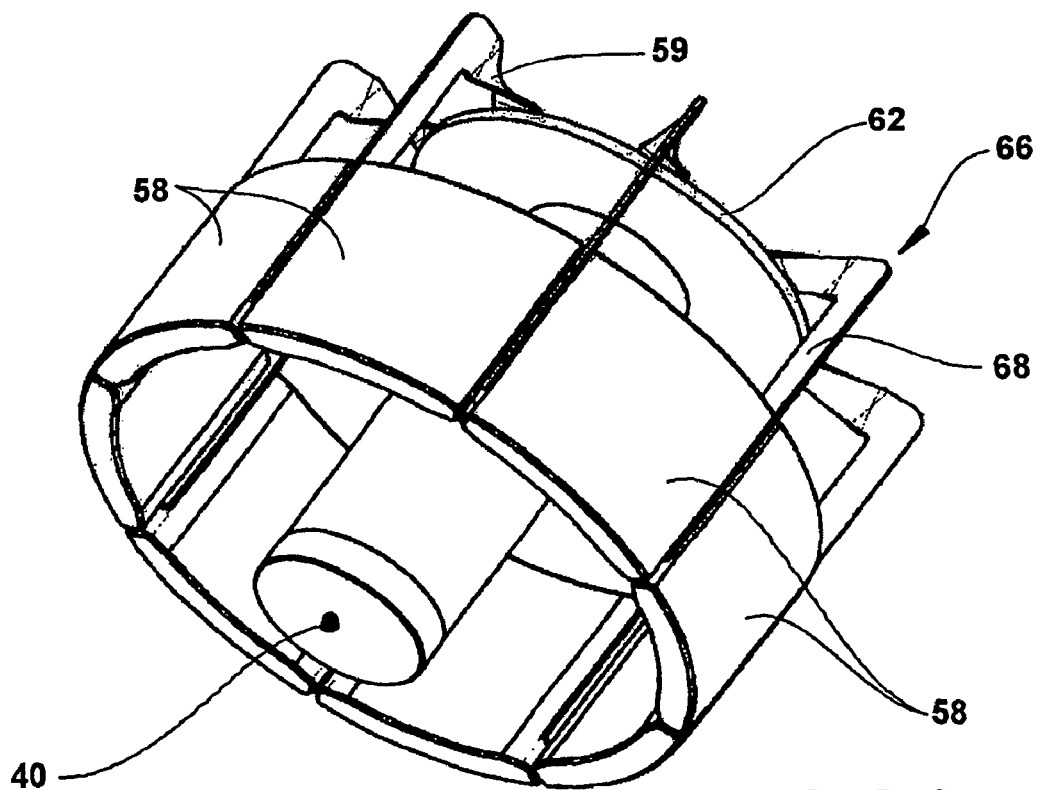
FIG. 3 is a lower perspective view of the support considered herein.

FIGS. 2 and 3 show the details of the support 54 of the present invention. The support 54 has a circular base plate or disk 62, which is a flat piece and is shown as being placed on and affixed to the upper surface of the base flange 42 of the piston, said fixation being achieved by welding, gluing or any other fixing means of the plate to the base flange 42. The base plate 62 is of a material, such as low carbon stamped steel. The base plate 62 has a central hole 64 to allow the plate to fit around the piston 40. There are provided a plurality of finger plates 66, preferably "L" shaped, which may or may not be constructed of the same material as the circular base plate 62 and which are spaced around the circumference of the latter. The number of the finger plates 66 basically depends on the type and size of the magnets 58 to be utilized. Each finger plate 66 has a short leg 67 attached to the base plate 62. The short legs 67 are bent by 90o at point 59, so as to form tabs 65 to be parallel to the base plate 62, said tabs 65 being firmly attached to the base plate 62 by any suitable process, such as welding. The long legs 68 of the finger plates 66 have their internal edges turned to the central axis of piston 40, and present two flat sides, each flat side of one finger plate 66 generally facing the flat side of the adjacent finger plate 66. As illustrated, the base plate 62 and the finger plates 66 of the support are made of a flat plate material. This reduces manufacturing costs, since the support elements can be easily stamped or punched in a sheet of material, and no special manufacturing is required, such as casting or molding. Moreover, the solution proposed herein leads to relatively little waste of material.

A magnet 58, of the permanent type, is mounted between the flat sides of each pair of two long legs 68 of adjacent finger plates 66, at the ends of said finger plates 66. A space is provided between the base plate 62 of the support and the magnets 58. The magnets 58 are made of any adequate conventional material and are arcuated in shape and the assembly of all magnets between the finger plates 66 around the support forms a toroidal structure at the ends of the finger plates 66. The mounting of the magnets 58 to the support can be effected by any suitable means, for example an epoxy adhesive. The completed toroid of the magnets 58 and finger plates 66 forms a rigid and stable structure that can be easily mounted to the piston.

In a typical arrangement, the diameter of the base plate of the support is about 65 mm (2.559 inches), having 8 finger plates 66 equally spaced around the base plate and 8 magnets of a ferromagnetic material, such as for example, boron or strontium ferrite, the material of the plate being generally stamped low carbon steel and the thickness of the plate material ranging between 1.5 and 4 mm (0.059 and 0.157 inches). As an alternate arrangement for the magnets, the long legs 68 of the finger plates 66 can have "U" shaped channels on the flat sides, and the ends of the magnets can fit in said channels. As another mounting arrangement, a magnet 58 can be formed with a channel at each of the ends thereof and the finger plates 66 inserted in these channels. In such arrangement, two finger plates 66 can be provided at one point on the base plate 62. It should be further understood that any other adequate mounting arrangement might be used. According to FIG. 1, the base plate 62 of the support is mounted to the top face of the base flange 42 of the piston, such as by welding. The base plate 62 and the finger plates 66 are of a proper size, such that the toroidal arrangement of the magnets 58 fit in the space defined between the external wall of the cylinder 16 and the coil 50. When electric current is applied to the coil 50, the magnetic field that is produced reacts with the magnets 58 to generate a force that acts through the finger plates 66, the base plate 62, and the base flange 42 of the piston 40, to cause displacement of the latter.

As alternatives for mounting the support 54 to the piston, the finger plates 66 can have bent lower ends to be connected directly to either the upper or lower surface of the base flange of the piston 40. In this case, there is not provided a base plate for the support. Also, the base plate 62 of the support can be connected to the lower surface of the base flange 42, and the finger plates 66 connected to the base plate 62.

The structure of the magnet support of the invention reduces manufacturing costs, since only a small amount of metal is used in its construction. In the prior art, many of the magnet supports are continuous, thereby using a substantial amount of material. The construction of the invention optimizes the use of material in relation to the stiffness of the structure that is formed. Also, the structure of the magnet support of the invention minimizes electric losses due to Foucault currents, since only a small amount of metal is used for the finger plates 66. Since the structure that supports the magnets is formed from thin plates arranged aligned to the magnetic field lines from the coil, the losses due to Foucault currents are substantially reduced, allowing the use of less noble and cheaper materials.

While the invention has been described in relation to a preferred embodiment of the linear electric motor to drive the piston of a compressor, it should be understood that the present magnet support can be used in other devices, in which a shaft or any other mechanism is to be reciprocated by the action of a linear electric motor.

Specific features of the invention are shown in one or more of the drawings for convenience only, as each feature may be combined with other features in accordance with the invention.

Alternative embodiments will be recognized by those skilled in the art and are intended to be included within the scope of the appended claims. Accordingly, the above description should be construed as illustrating, and not limiting the scope of the invention.

What is claimed is:

1. A linear electric motor, for driving a movable member in a reciprocating motion comprising:
   a coil fixedly mounted and receives an electric current;
   an assembly of magnets mounted to a support structure;
   a movable member comprising a support having a plurality of finger plates having a first end and a second end wherein the first end is mounted to the movable member, and a magnet of arcuate shape mounted between each pair of adjacent finger plates to form a toroidal assembly of magnets wherein the second end is mounted only to the magnet.

2. A linear electric motor as claimed in claim 1, used in a compressor having a piston as the movable member that is to be reciprocated in a cylinder to compress gas, wherein the support structure is mounted to the piston and reciprocates with the piston.

3. A linear electric motor as claimed in claim 2, wherein each finger plate is formed of a flat material, with an edge being disposed radially aligned in relation to the central axis of the piston.

4. A linear electric motor as claimed in claim 3, wherein the support has a base plate mounted to the piston and to which the finger plates are affixed.

5. A linear electric motor as claimed in claim 3, wherein the piston has a base flange to which the finger plates are affixed.

6. A linear electric motor as claimed in claim 3, wherein the piston has a base flange and the support has a base plate to which the finger plates are mounted, the base plate being mounted to the base flange of the piston.

7. A linear electric motor as claimed in claim 6, wherein the finger plates are bent to form an "L" shape with a tab that is attached to the base plate and with a long leg to which is attached the magnet.

8. A linear electric motor as claimed in claim 6, wherein the compressor has a block with an internal wall to which the coil is attached and in which the cylinder is formed, wherein the toroidal assembly of magnets is positioned and moves linearly between the external wall of the cylinder and the coil.

9. A linear electric motor as claimed in claim 7, wherein the compressor has a block with an internal wall to which the coil is attached and in which the cylinder is formed, wherein the toroidal assembly of magnets is positioned and moves linearly between the external wall of the cylinder and the coil.

10. A linear electric motor, for driving a movable member in a reciprocating motion comprising:
    a coil fixedly mounted and receives an electric current;
    a support structure having a plurality of "L" shaped finger plates, a base plate, and a free end, wherein the base plate is mounted to the movable member;
    an assembly of magnets mounted to the support structure; and
    a magnet of arcuate shape mounted between each pair of adjacent finger plates to form a toroidal assembly of magnets.

11. A linear electric motor, for driving a movable member in a reciprocating motion comprising:
    a coil fixedly mounted and receives an electric current;
    a support structure having a plurality of finger plates with only one end connected to the movable member and the other end free to allow for direct attachment to magnets;
    an assembly of magnets mounted to the support structure; and
    a magnet of arcuate shape mounted between each pair of adjacent finger plates to form a toroidal assembly of magnets.

* * * * *